April 2, 1929.                H. A. CASE                1,707,508
              AUTOMATIC INFLATER FOR PNEUMATIC TIRES
                      Filed April 21, 1928

INVENTOR
Hiram G. Case.

Patented Apr. 2, 1929.

1,707,508

UNITED STATES PATENT OFFICE.

HIRAM A. CASE, OF LOS ANGELES, CALIFORNIA.

AUTOMATIC INFLATER FOR PNEUMATIC TIRES.

Application filed April 21, 1928. Serial No. 271,760.

This invention relates to a device adapted to be attached to the wheel of the motor vehicles to automatically maintain the tires thereof in a properly inflated condition.

The invention provides improved means to prevent tire leaks due to punctures or other causes, from injuring the tire casing, as said casing will automatically be supplied with an amount of air sufficient to prevent any ordinary leak from causing deflation, thus making it unnecessary for the autoist to travel with a "flat" tire until he has an opportunity to repair an injured one.

An important object of the invention is to simplify the means for attaching an appliance of this kind to the wheel of a self-propelled vehicle. By this invention an air pump construction is provided which can be easily attached to the wheels of automobiles now on the market without any remodelling of or alterations in such wheels.

A further object is the provision of an improved contrivance for automatically disconnecting the pump operating means when the air pressure within the tire reaches the desired amount and also to automatically place the pump into operation again when such air pressure becomes too low.

Other objects and advantages may hereinafter appear.

Referring to the accompanying drawings, which illustrate a preferred embodiment of the invention.

Figure 1:
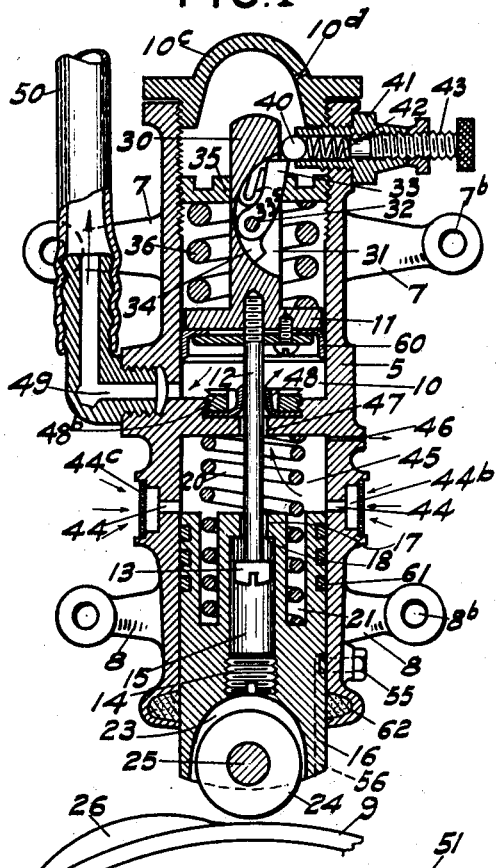
Figure 1, is a vertical mid-section of my newly invented air pump showing the parts thereof in the operating position which they automatically assume when the air pressure within the tire of the wheel to which the appliance is assumed to be attached has fallen as low as the appliance is adjusted to permit. A fragment of the brake band is also shown in this view.

Referring in detail to the drawings, the cylindrical pump casing 5, shown attached between the wheel spokes 6, is provided with the radially extending oppositely disposed outer arms 7 and the somewhat shorter arms 8, said arms 8 being located near the inner end of the casing, by the inner end being meant the end nearest the brake band 9 of the wheel.

Arms 7 and 8 are respectively provided with bolt or screw holes 7$^b$ and 8$^b$ whereby the appliance is bolted to the wheel or is secured thereto in any other desired manner.

It is to be understood that the appliance is designed to be attached to disc wheels and also various other designs of vehicle wheels now on the market.

Within said casing 5 is an auxiliary piston chamber 10 having an auxiliary piston head 11 fitted therewithin, this auxiliary piston head cooperating with a main piston described later. Said piston head 11 has screwed into one end thereof a piston rod 12 which, at its lower end as viewed in Figs. 1 and 2, has a head 13 adapted to receive a screw-driver whereby the distance which said piston rod projects from the piston head 11 may be regulated.

The head 13 of piston rod 12 is contained within a bore 15 within a plunger or main piston 16 which is slidably fitted within the end portion of the main casing 5, said bore being provided with a contracted portion or neck 17 within which the piston rod 12 may reciprocate, and with an annular shoulder 18 which the head 13 at times engages. Chamber 45 above plunger 16 contains a compression spring 20 which tends at all times to force said plunger toward the brake band 9, an annular groove 21 around the bore 15 forms a seat for spring 20 and also provides more longitudinal space for said spring to increase its operative efficiency.

Within the outer or lower end of plunger 16 is a semi-circular recess 23 within which is mounted an antifriction roller 24 on a pintle 25 which extends transversely of the plunger and which maintains said roller in a position wherein a portion of its periphery is at all times exposed beyond the end of the plunger and when said plunger is extended to operating position, in the path of an arcuate cam 26 formed on or secured to the brake band 9.

Resuming description of the auxiliary piston head 11, said head is provided at one side with a central stem or extension 30, said stem containing a longitudinally extending concavity or recess 31 within which is pivoted on a transversely extending pin 32 an upwardly extending (as viewed in the drawings) dog 33, said dog having at its lower end a heel 34 which keeps its free end from swinging completely out of said recess. Stem 30, together with dog 33, play through a guide nut 35 which is screwed into the main casing 5. A compression spring 36 operates between nut 35 and piston head 11, and a U-shaped leaf spring 33' continually tends to force the free end of dog 33 out of recess 31 and into a position wherein said dog will either engage or underlie a spherical plunger 40 which forms a portion of the governing device next to be described.

Said governing device comprises an externally threaded tubular member 41 which extends through a radial threaded aperture in the main casing, and which contains the compression spring 42 which continually presses upon ball plunger 40, and the manually adjustable threaded stem 43 which engages the outer end of said spring and regulates the tension thereof.

As shown in Fig. 1, the space between the inner end of tubular member 41 and the adjacent side of stem 30 is sufficiently narrow to keep ball 40 in place, and said stem never retracts far enough to permit the escape of said ball. When the concavity 31 is opposite said ball the latter engages the outer edge of dog 33. A cap 10ᶜ having a relief port 10ᵈ is screwed into the upper end of the main casing.

With regard to ports and air passages, intake ports 44 lead into the main piston chamber 45, said ports being located at points slightly above the main piston or plunger 16 when said piston is at the downward limit of its travel as seen in Fig. 1. Intake ports 44 lead from an external annular recess 44ᵇ which is covered by a foraminated band 44ᶜ. Chamber 45 is also provided, at it stop, with a bleed duct 46 and with an annular outlet passage 47 around the piston rod 12. Above outlet passage 47 is a check valve 48 which permits air to pass from chamber 45 to chamber 10, but prevents back flow from the latter chamber. 49 is an outlet passage from chamber 10 to conduct air by way of the flexible tube 50 to the tire 51. 48ᵇ is a retaining plug for valve 48.

The movement of plunger 16 toward the hub of the wheel is limited by a screw bolt 55 which projects through the casing wall into a groove 56 in the side of said plunger.

Packing elements 60, 61 and 62 are provided for the pistons. The lower end of bore 15 is closed by a screw plug 14.

Figure 2:
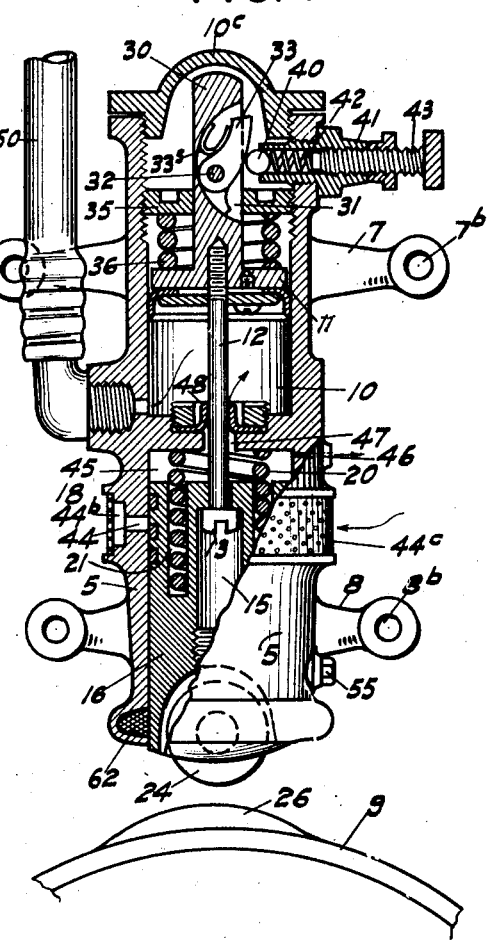
Figure 2, is a like section but showing the position which the parts automatically assume when the pump has been rendered inactive by reason of the required air pressure having been supplied to the tire.
Figure 3:
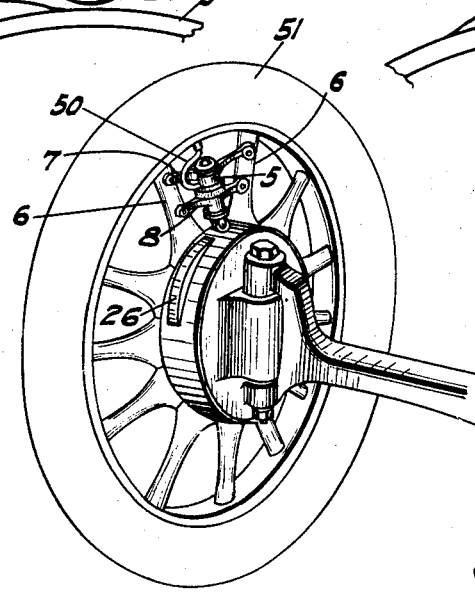
Figure 3, is a perspective view of an automobile wheel illustrating the means for attachment of the appliance thereto.

In operation, at each revolution of the vehicle wheel to which the appliance is attached, the roller 24 is moved across cam 26 thus moving plunger 16 against the opposition of spring 20, closing ports 44 and then forcing past check valve 48 into chamber 10 a portion of the air confined in chamber 45. In leaving cam 26, roller 24 permits spring 20 to restore plunger 16 again to its extended position before the roller 24 re-engages cam 26. These movements of plunger 16 are repeated until a sufficient amount of air from the chamber 10 of the auxiliary piston has been forced into the tire to raise the air pressure, both within the tire and within chamber 10, to a point which will cause the auxiliary piston head 11 to overcome the resistance of spherical plunger 40 to its dog 33, whereupon the auxiliary piston and the parts carried thereby will move quickly up from the position of Fig. 1 to that of Fig. 2, thus through the operation of rod 12 and its head 13 bringing the main piston 16 up to the inoperative position thereof as shown in Fig. 2. The ports will remain in this position until the air pressure in the tire, and therefore in chamber 10, falls sufficiently to allow the compression springs 36 and 20 to restore both pistons to their original positions.

The cam for actuating the appliance may be attached to any other conveniently located stationary part if it cannot be placed on the brake band.

I claim:

1. In a device of the character described, a tubular casing having in one portion of its length a main piston chamber and in another portion of its length an auxiliary piston chamber, a main piston and an auxiliary piston to operate respectively in said main and auxiliary chambers, cam operable means operatively connected with said main piston to move said piston in one direction, a spring to move said piston in the reverse direction, a valve-controlled air passage connecting said main and auxiliary chambers through which air is pumped into said auxiliary chamber by said main piston, an air conduit to conduct air from said auxiliary chamber, a spring to cause said auxiliary piston to oppose air pressure being built up in said auxiliary chamber, a governing device for said auxiliary piston, said device being adapted to permit a sudden release movement of said auxiliary piston away from the air pressure thereagainst when said air pressure exceeds a predetermined amount and to permit its return under the pressure of its spring when the air pressure falls again, and means operatively connecting said auxiliary piston with said main piston whereby said release movement afforded by said governing device moves said main piston to a position wherein its cam-operable means are rendered inactive.

2. In a device of the character described, the combination, with main and auxiliary pistons, cylinders for said pistons, and means to operate said main piston to pump air into the auxiliary piston chamber; of a governing device for said auxiliary piston, said governing device having a plunger which travels in a plane transverse to the axis of said auxiliary piston and which maintains said auxiliary piston in normal position until said auxiliary piston is forced past it to an inoperative position by air pressure in said auxiliary chamber, connecting means between said pistons to cause this movement of said auxiliary piston to move said main piston to an inoperative position, and means to restore both of said pistons to the operative position against the opposition of said governor when the air pressure in said auxiliary chamber falls to a predetermined amount.

3. In a device of the character described, the combination, with main and auxiliary pistons, cylinders for said pistons, and means to operate said main piston to pump air into the auxiliary piston chamber; of a governing device for said auxiliary piston, said governing device having a plunger which travels in a plane transverse to the axis of said auxiliary piston and which maintains said auxiliary piston in normal position until said auxiliary piston is forced past it to an inoperative position by air pressure in said auxiliary chamber, connecting means between said pistons to cause this movement of said auxiliary piston to move said main piston to an inoperative position, and means to restore both of said pistons to the operative position against the opposition of said governor when the air pressure in said auxiliary chamber falls to a predetermined amount, said governing device comprising a tube having an open end portion and the said plunger thereof being a spherical body, a compression spring within said tube of said plunger which holds said spherical body projected more or less beyond the open end of said tube, a dog in said auxiliary piston provided with a spring which yieldingly holds said dog in a position wherein its travel together with that of the auxiliary piston is yieldingly obstructed in both directions by said spherical body.

4. In a device of the character described, the combination, with main and auxiliary pistons, cylinders for said pistons, and means to operate said main piston to pump air into the auxiliary piston chamber; of a governing device for said auxiliary piston, said governing device having a plunger which travels in a plane transverse to the axis of said auxiliary piston and which maintains said auxiliary piston in normal position until said auxiliary piston is forced past it to an inoperative position by air pressure in said auxiliary chamber, connecting means between said pistons to cause this movement of said auxiliary piston to move said main piston to an inoperative position, and means to restore both of said pistons to the operative position against the opposition of said governor when the air pressure in said auxiliary chamber falls to a predetermined amount, a dog in said auxiliary piston which is carried thereby, when the main piston is operating, the free end of said dog being in lateral engagement with the plunger of said governing device and being constructed and arranged to slide over and beyond said plunger when impelled by a predetermined amount of pressure from the air accumulated in the auxiliary piston chamber, the side of said dog after it has been moved beyond said plunger engaging the latter and offering a predetermined amount of resistance to the return movement of said auxiliary plunger, said dog being provided with a spring which regulates its resistance in both the recited movements of said auxiliary piston.

5. In a device of the character described, the combination, with an auxiliary piston; of a governor to yieldingly hold said piston retracted or extended, said piston having an axial stem and said governor comprising a tube which extends radially with respect to said stem and has an open end adjacent to the side of said stem, a spherical plunger within said tube and at all times prevented by said stem or its appendages from escaping from said tube, a compression spring within said tube engaging said spherical plunger, there being a recess in the side of said stem, and a spring pressed dog mounted in said recess, said dog being positioned to encounter said spherical plunger and thus yieldingly oppose force tending to move said auxiliary piston away from its retracted position and also to encounter said spherical plunger and yieldingly oppose force tending to move said auxiliary piston away from its extended position.

6. In a device of the character described, control mechanism comprising an auxiliary piston having a stem with a recess in its side, a spring actuated dog in said recess and extending longitudinally of said stem but inclined in such a manner that its free end protrudes beyond said recess, and a governing device comprising a spring pressed spherical plunger and a tubular housing positioned to yieldingly hold said plunger against the recessed side of said stem in position to govern the movement of said stem and dog back and forth across said plunger.

7. In a device of the character described, a casing comprising a main piston chamber and a control piston chamber separated by a cross wall having an air passage therethrough, a check valve in said passage through which the air flows from said main to said control chamber, a piston in each of said chambers, cam actuated means to move to retracted position the piston in said main chamber, and a compression spring acting between said cross wall and the main piston to extend the latter, said main piston comprising a plunger having in one end an annular groove in which said spring seats and which is of sufficient depth to receive the greater portion of said spring.

8. In a device of the character described, a casing comprising a main piston chamber and a control piston chamber separated by a cross wall having an air passage therethrough, a check valve in said passage through which the air flows from said main to said control chamber, a piston in each of said chambers, cam actuated means to move to retracted position the piston in said main chamber, and a compression spring acting between said cross wall and the main piston to extend the latter, said main piston comprising a plunger having in one end an annular groove in which said spring seats and which is of sufficient depth to receive the greater portion of said spring, said plunger having a bore, a portion of which is surrounded by said annular groove, an annular shoulder at the inner end of said bore, a control rod having a head within said bore adapted to engage said shoulder, and governing means to actuate said control rod.

9. In a device of the character described, the combination, with main and auxiliary pistons, cylinders for said pistons, and means to operate said main piston to pump air into the auxiliary piston chamber; of a governing device for said auxiliary piston, which maintains said auxiliary piston in normal position until said auxiliary piston is forced to an inoperative position by air pressure in said auxiliary chamber, connecting means between said piston to cause this movement of said auxiliary piston to move said main piston to an inoperative position, and means to restore both of said pistons to the operative position against the opposition of said governor when the air pressure in said auxiliary chamber falls to a predetermined amount.

HIRAM A. CASE.